(No Model.)
2 Sheets—Sheet 2.

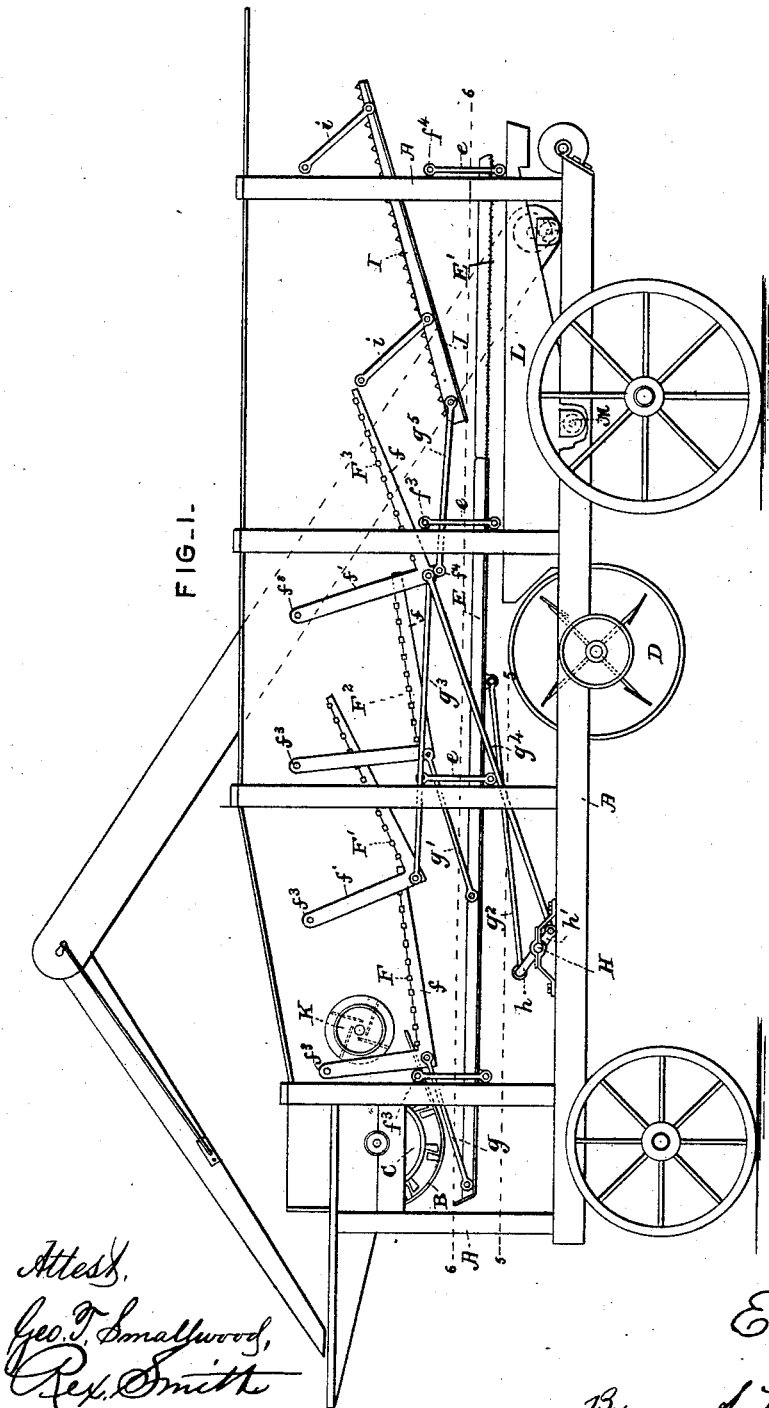

E. W. FLAGG.
GRAIN SEPARATOR.

No. 367,750. Patented Aug. 2, 1887.

Attest:
Geo. T. Smallwood.
Jno. L. Condron.

Inventor:
Eli W. Flagg.
by A. M. Smith
Attorney

UNITED STATES PATENT OFFICE.

ELI W. FLAGG, OF BATTLE CREEK, MICHIGAN, ASSIGNOR OF ONE-HALF TO EDWIN C. NICHOLS, OF SAME PLACE.

GRAIN-SEPARATOR.

SPECIFICATION forming part of Letters Patent No. 367,750, dated August 2, 1887.

Application filed December 15, 1886. Serial No. 221,640. (No model.)

*To all whom it may concern:*

Be it known that I, ELI W. FLAGG, of Battle Creek, county of Calhoun, and State of Michigan, have invented a new and useful Improvement in Grain-Separators, of which the following is a full, clear, and exact description, reference being had to the accompanying drawings, making part of this specification.

My invention relates to mechanism for separating grain from the straw during the passage of the latter from the thrashing-cylinder to the straw-stack through the thrashing-machine; and the objects of my invention are, first, to effect a thorough and complete separation of the grain from the straw as it leaves the thrashing-cylinder, and, secondly, to produce an extended movement of the agitating and operating devices.

For the above purpose my invention consists, first, in a shaking frame or section pivoted at one end only upon the machine and having an oscillating and rising-and-falling movement for feeding and opening the straw, as hereinafter described and claimed.

My invention further consists in a series of slatted sections, forming a conveyer for the straw and arranged to swing backward and forward for the purpose of feeding the straw and to rise and fall at their outer ends for agitating and opening the straw, and thus allowing the complete discharge of the grain from the straw.

My invention further consists in a peculiar and novel arrangement of connections for actuating the slatted sections in the manner above described.

My invention consists, further, in certain peculiar and novel features of construction and arrangement as hereinafter described and claimed.

In order that my invention may be fully understood, I will proceed to describe it with reference to the accompanying drawings, in which—

Figure 5:
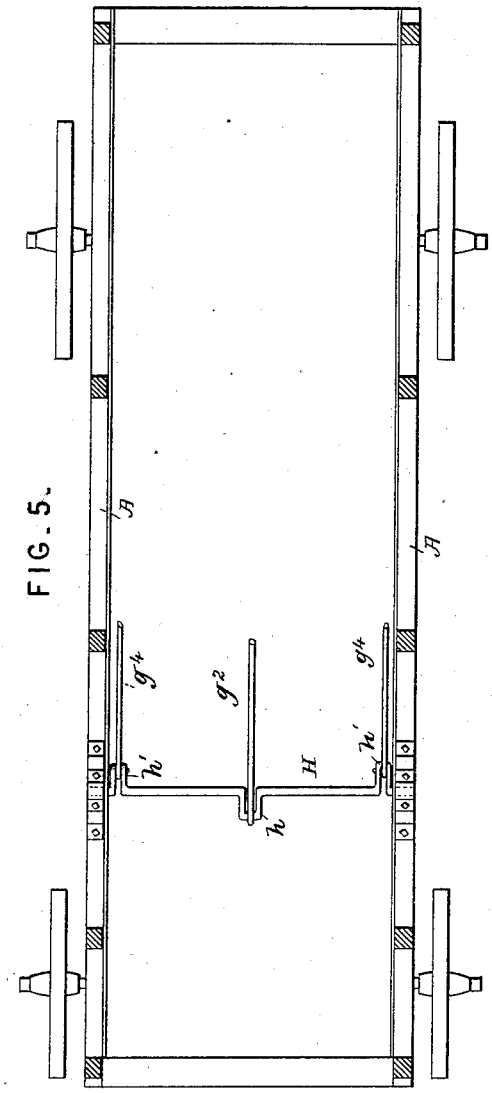
Figure 6:
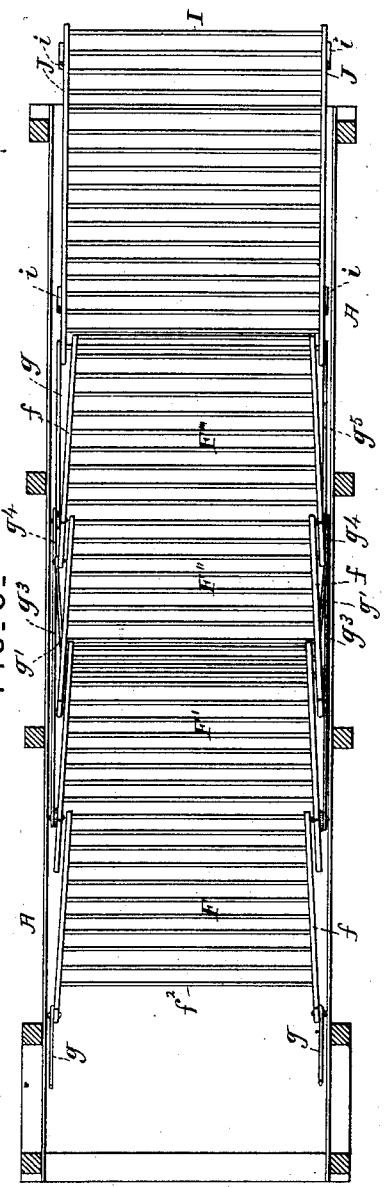

Figure 1 is a side elevation of a thrashing-machine with the casing or frame-work partially removed to expose the internal mechanism. Figs. 2 and 3 illustrate certain details of construction, hereinafter described. Fig. 4 is a perspective view of the beater used in connection with my improvements and forming a part thereof. Fig. 5 is a plan view of the crank-shaft and its connections, as seen from above, on the line 5 5 of Fig. 1. Fig. 6 is a horizontal cross-section of the machine on the line 6 6 of Fig. 1, viewed from beneath, and showing the double connections between the pan and the straw-shakers.

In the said drawings, A designates the frame or casing of a thrashing-machine, in the forward portion of which is placed the concave B and thrashing-cylinder C, of the usual or any preferred form, and in the lower portion of which is located the blast-fan D, for separating the chaff from the grain.

In the lower portion of the casing is placed the pan E, which is hung upon a series of flexible or pivotal hangers, $e$, arranged in pairs at opposite sides of the pan and connected at their upper ends to the sides of the casing, while their lower ends are connected to the sides of the pan, as shown. Above this pan is placed a series of slatted straw-shakers, F F' F² F³, each of which is composed of side pieces, $f$, and bars $f'$, extending rigidly upward from the rear ends of said side pieces. These side pieces, $f$, are connected by transverse slats $f^2$, placed at suitable distances apart, as shown, and are suspended from the frame A by pivot-bolts $f^3$, passing through the upper ends of the upright bars $f'$. As shown in the drawings, the outer end of each section overlaps the inner end of the succeeding section, so as to form a continuous support for the straw. The first slatted section, F, is connected at its receiving end by a pair of pivoted bars, $g$, to the forward end of the pan E, while the third section, F², is connected at its receiving end by a pair of pivoted bars, $g'$, to the sides of the said pan, so that the first and third sections are caused to move together by the swinging movement of the pan. This swinging movement of the pan is produced by a bar, $g^2$, pivoted at its rear end to the under side of the pan E and connected at its forward end to a crank, $h$, on the crank-shaft H, as shown.

The receiving end of the second shaker, F', is connected by a pair of pivoted bars, $g^3$, to the heel or receiving end of the fourth section, F³, while the heel of said section is connected by a pair of pivoted rods, $g^4$, to cranks $h'$ on the shaft H, (see Fig. 5,) said cranks $h'$ extending oppositely to the crank $h$, so that the shakers $F' F^3$ move together and alternate with the shakers $F F^2$ in their operative movements.

At the rear portion of the frame A is placed a slatted straw-shaker, I, which is suspended in inclined position by four hangers, $i$, as shown. The receiving end of this frame is connected by a pair of links, $g^5$, to a pair of lugs, $f^4$, on the heel of the fourth shaker, $F^3$. Immediately beneath the frame I lies a screen-extension, $E'$, of the pan E, upon which falls the grain, a solid bottom, J, extending beneath the said frame and guiding the grain therefrom upon said extension.

Immediately in front of the cylinder C is placed a beater, K, consisting, preferably, of radial floats $k$, attached to a shaft, $k'$, and secured at their ends by a pair of disks, $k^2$, said shaft being properly journaled in the frame A and driven by suitable belting. After the grain has been thrashed by the cylinder C it is thrown upon the shakers $F F' F^2 F^3$ by the beater K. These shakers rise and fall at their outer ends and swing backward and forward alternately in pairs, so as to lift and drop the straw and thoroughly open the same while feeding it out of the machine, thus entirely separating the grain from the straw. The alternate rising and falling and swinging movement of the slatted shakers not only produce the described undulations of the straw, but also roll or agitate the same so as to insure the discharge of all the grain. After falling upon the screen-extension $E'$ the grain drops upon the chute L, and from thence into the grain-conveyer M, at which moment it is winnowed by the fan and then fed out of the machine, the straw being carried out over the section I.

Having thus described my invention, what I claim as new, and desire to secure by Letters Patent, is—

1. In a shaker thrashing-machine, an L-shaped straw-shaker slatted at its lower portion and hung pivotally at the upper ends of its upright arms, substantially as described.

2. An improved separator attachment for thrashing-machines, consisting of a longitudinal series of straw-shakers, each pivoted at one end only, in combination with the supporting-frame, the crank-shaft H, having cranks $h$ and $h'$, the pan E, and the links or rods connecting the heel ends of said shakers with said pan and shaft, whereby they are oscillated at their inner ends and a rising-and-falling movement is imparted to their outer ends, substantially as set forth.

3. In a thrashing-machine separator, the combination, with a series of oscillating slatted straw-shakers and an oscillating pan, of bars connecting said shakers in alternate pairs, bars connecting one pair of said shakers to the pan, a crank-shaft, and rods connecting the alternate pair of shakers to said crank-shaft, substantially as described.

4. The combination, with the frame, the oscillating pan and its hangers, and the crank-shaft, of the separator-sections $F F' F^2 F^3$, with their bars $f$, pivoted to the frame, the connecting-bars from the pan to one pair of said sections, the connecting-bars from the crank-shaft to the other pair of sections, and the links for connecting said sections in pairs, substantially as described.

5. The combination, with the frame and the oscillating pan, of the longitudinal series of L-shaped slatted shakers, the inclined swinging slatted shaker I, the rods connecting the alternate shakers to the pan, the rods connecting the last shaker to the swinging inclined shaker, the shaft, with its oppositely-disposed crank, and the rods connecting said shaft to one of said shakers and to the oscillating pan, all substantially as shown and described.

In testimony whereof I have hereunto set my hand this 13th day of December, A. D. 1886.

ELI W. FLAGG.

Witnesses:
A. C. KINGMAN,
FRANK W. DUNNING.